Nov. 22, 1927.  
L. A. PAINE  
1,649,851  
MEANS FOR MEASURING VOLT AMPERES  
Filed Jan. 17, 1923   3 Sheets-Sheet 1

Nov. 22, 1927.

L. A. PAINE 1,649,851

MEANS FOR MEASURING VOLT AMPERES

Filed Jan. 17, 1923  3 Sheets-Sheet 2

Inventor
Louis A. Paine
by H. J. S. Dennison
atty

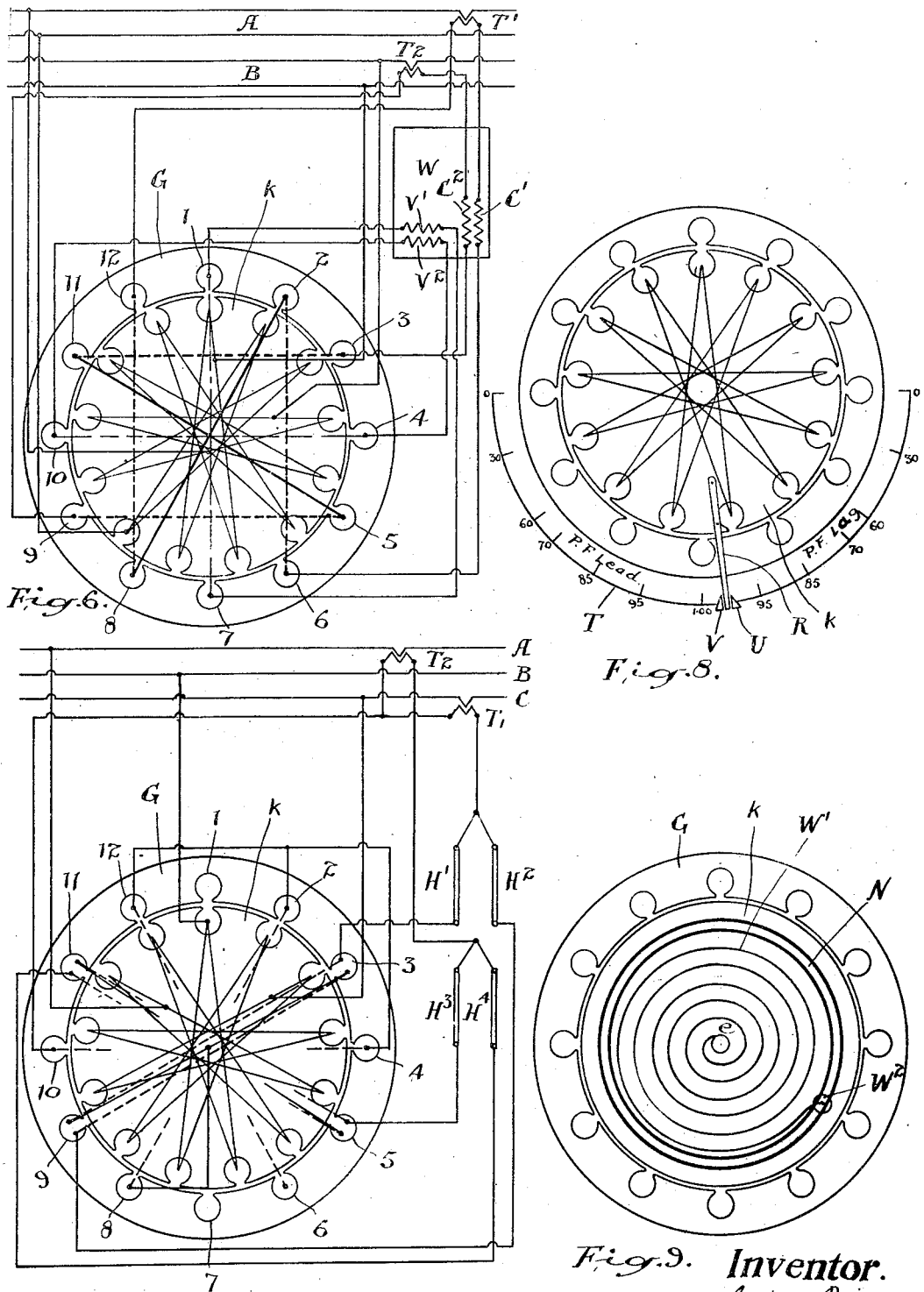

Patented Nov. 22, 1927.

1,649,851

UNITED STATES PATENT OFFICE.

LOUIS A. PAINE, OF TORONTO, ONTARIO, CANADA, ASSIGNOR TO THE LINCOLN METER COMPANY, LIMITED, OF TORONTO, CANADA.

MEANS FOR MEASURING VOLT AMPERES.

Application filed January 17, 1923. Serial No. 613,238.

The principal objects of this invention are to devise a practical method of utilizing standard watt meters or watt hour meters for measuring volt amperes or volt ampere hours and to devise a simple means for shifting the angular phase position of an alternating voltage or current and further to enable the use of a low voltage meter on a high tension circuit.

A further important object is to devise a simple means for controlling phase position automatically by power factor.

The principal feature of the invention consists in effecting a shift in the angular phase position of voltages or currents in derived circuits in response to the power factor of the load under measurement by means of a single moving element and a single field, the magnitude of the derived voltage or current being proportional to the applied voltage.

A further important feature consists in effecting the shift of circuit connections or influences by utilizing a power factor meter which will automatically assume an angular position to produce a maximum magnetic flux through the joint influence of both current and voltage excited windings.

In the drawings Figure 1 is a diagram illustrating a method of carrying this invention into effect, in which the phase position of a 3 phase alternating voltage is automatically controlled by power factor.

Figure 1ª is a diagram illustrating the practical application of the transformer circuits illustrated in Figure 1.

Figure 6 is a diagram illustrating the application of the method of measurement in a 2 phase circuit.

Figure 7 is a diagram illustrating the application of the phase shifting power factor meter to a thermal demand watt meter for the registration of demand in volt amperes.

Figure 8 is a diagram illustrating a method of registering the limits of power factor variation.

Figure 9 is a diagram illustrating the method of correcting for rotational torque, as an induction motor.

Figure 1:
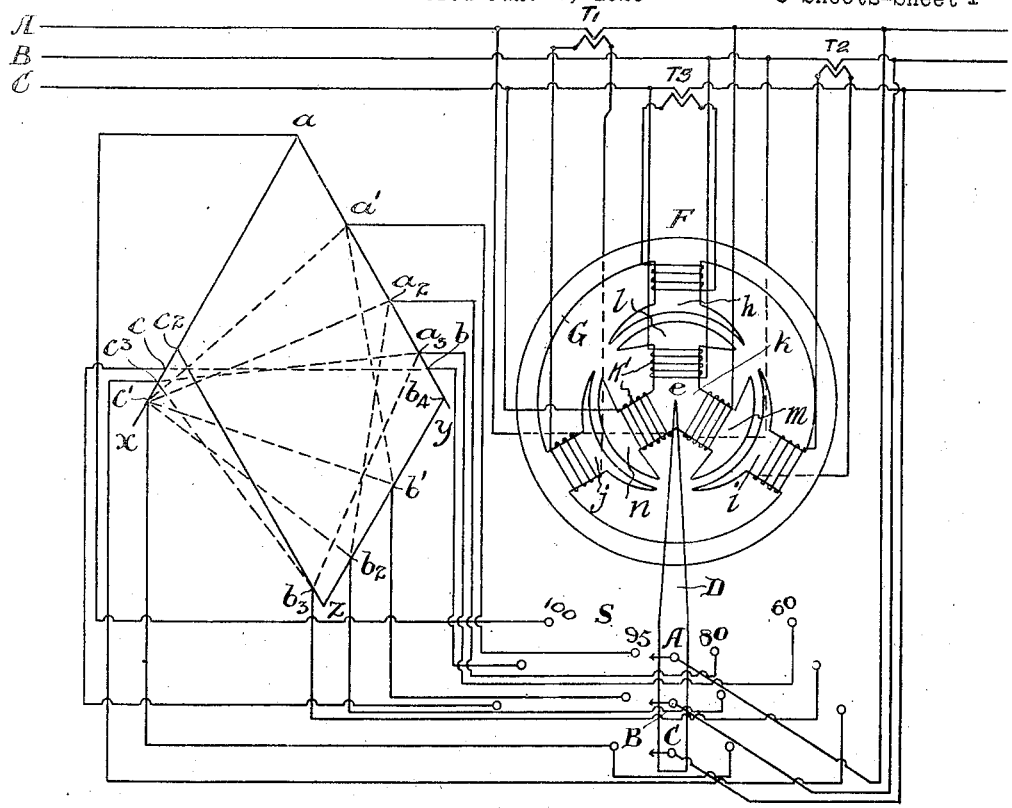
Figure 1A:
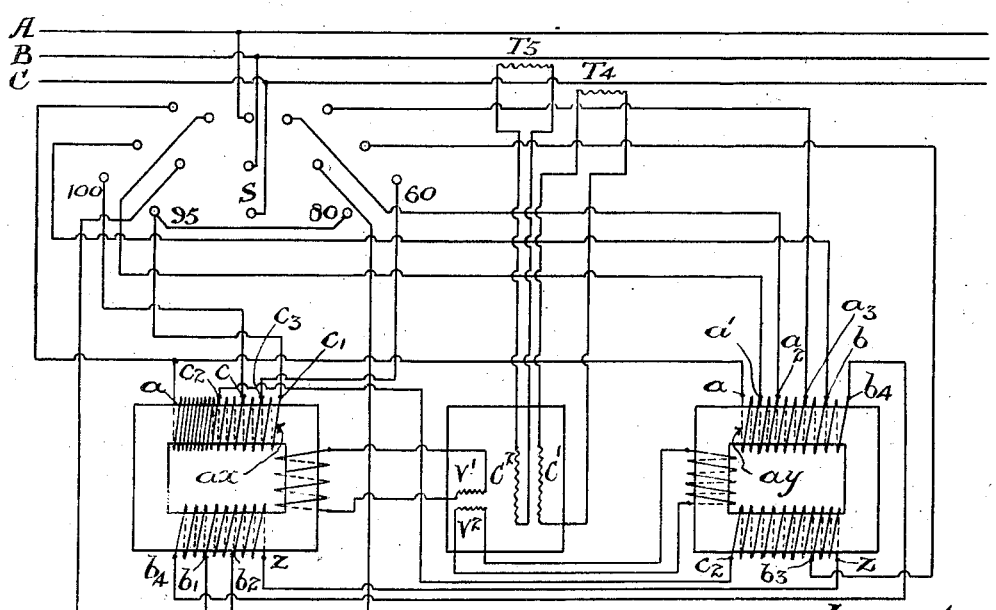

Referring to Figures 1 and 1ª, $ax$ and $ay$ are the primary windings of two single phase voltage transformers connected to the 3 phase circuit ABC and indicated in their relative phase positions in Figure 1. The secondaries of these transformers may be connected to any standard watt meter or watt hour meter as shown in Fig. 1ª if it be desired to measure the volt amperes or volt ampere hours of the circuit ABC.

On the same core as the winding $ax$ is placed an auxiliary winding $b_4z$ and on the core with $ay$ is placed an auxiliary winding $c_2z$. The number of turns in the winding $c_2z$ is the same as the winding $c_2z$ and the turns in the windings $b_4z$ equal those in the winding $ac_4$. Therefore when a 3 phase voltage is applied to the transformer terminals $abc$ the quadrilateral $ab_4\ zc_2$ represents, both in magnitude and phase position the voltages that will be developed in the windings described. It is obvious that if the values $ab_4$ and $ac_1$ be properly chosen and proper tap points be brought out from the transformer coils, it will be possible to shift the relative phase position of the secondaries on cores $ax$ and $ay$ by any desired amount by applying the circuit voltage to these tap points instead of to the original terminals $abc$. For example, if the circuit ABC is applied to taps $a'\ b'\ c'$ there will result a phase shift in the secondaries of the transformers $ax$ and $ay$ proportional to the angle $ac'\ a'$ or $b'\ a'\ y$, the taps being so selected that the triangle $a'\ b'\ c'$ is equal to the triangle $abc$.

It must also be understood that the tap points $b_4$ and $c_2$ are subject to variation as well as the number of turns in the transformer windings $ac_2$, $b_4z$, $ab_4$ and $c_2z$. With these tap points under control a phase shift of any desired degree in either direction may be secured. This method of phase shift always produces a derived secondary voltage of the same value which is a distinct advantage over previous methods where a limited number of phase shifts have been secured but the magnitude of the secondary voltage has not been constant at all points. This novel result is obtained by shifting all the circuit terminals to retain the same triangular relation for every shift.

The shift in phase position may be made manually or automatically as desired. As illustrated in Figure 1, a switch S is provided with a plurality of groups of contacts which are connected with different arrangements of taps. The switch arm D pivoted at $e$ is provided with contacts ABC connected with circuit ABC. The contacts indicated by 100 are connected to transformer terminals $abc$; contacts 95 are connected to transformer taps $a'b'c'$; contacts 80 are connected to taps $a_2 b_2 c'$ and contacts 60 are connected to taps $a_3 b_3 c_3$. The numerals 100, 95, 80 and 60 represent the power factors at which a watt meter will correctly read volt amperes in a specific form of this device that has been built, having been demonstrated by actual test. These values differ from the contiguous values by approximately 18° of angular phase shift, consequently the arrangement shown renders it possible to measure the volt amperes of a circuit with an error of less than 2% over a range of power factor from 100% to 43%, but while this arrangement is shown for illustration the method described is applicable to the measurement of volt amperes by a standard watt meter whether the circuit be lagging or leading and independent of the amount of lag or lead.

In the diagram Figure 1ª the transformers $ax$ and $ay$ correspond to the transformers $ax$ and $ay$ of Fig. 1 as also do the inter-connections and the connections to the switch S. The values 100, 95, 80 and 60 are given as these have been actually put into practice but obviously other values may be chosen and additional values may be used if desired. In Figure 1ª the current windings $C^1$ and $C^2$ of a watt meter are shown connected to transformers $T_4$ and $T_5$, and its voltage windings $V^1$ and $V^2$ are connected to the secondaries of the transformers $ax$ and $ay$.

In order to effect the shift of the switch S automatically a power factor meter is used as illustrated in the diagram Figure 1, the meter F having a stator G provided with poles $h$, $i$ and $j$. A rotor $k$ whose axis is at $e$ is provided with poles $l$, $m$ and $n$. The stationary poles $h$, $i$ and $j$ are excited by currents of the load to be measured derived from C, B and A through transformers $T_1$, $T_2$, $T_3$, if desired. The rotor $k$ is excited from the voltage of the circuit under measurement.

As is well known, such windings will set up magneto motive forces both in the rotor $k$ and the stator G and these two magneto motive forces will jointly set up a magnetic flux. It is also well known that if the rotor $k$ is free to move about its axis $e$, as assumed, said rotor will take up a position such that the magnetic flux produced by the joint action of all the magneto motive forces present will be a maximum. The angular position of the rotor $k$ will therefore depend on the power factor of the load under measurement; in other words, the structure F becomes a power factor meter and may be made sufficiently powerful to operate the switch S shown in Figures 1 and 1ª.

As shown in Figure 1, both the rotor $k$ and the stator G are wound with polyphase windings producing rotating fields in both members. The power factor meter will still operate successfully if only one of these fields is a rotating field and the other a single phase alternating field but making both fields rotating is preferable since correct operation is still maintained in the event of single phase loading and more accurate operation is obtained in the case of unbalanced loading in a polyphase circuit. It must be understood that the direction of magnetic rotation is the same if rotating magneto motive forces are used on both rotor and stator. It is also well known that in such a power factor meter, stator and rotor windings may be interchanged without interfering with successful operation of the device.

Figure 2:
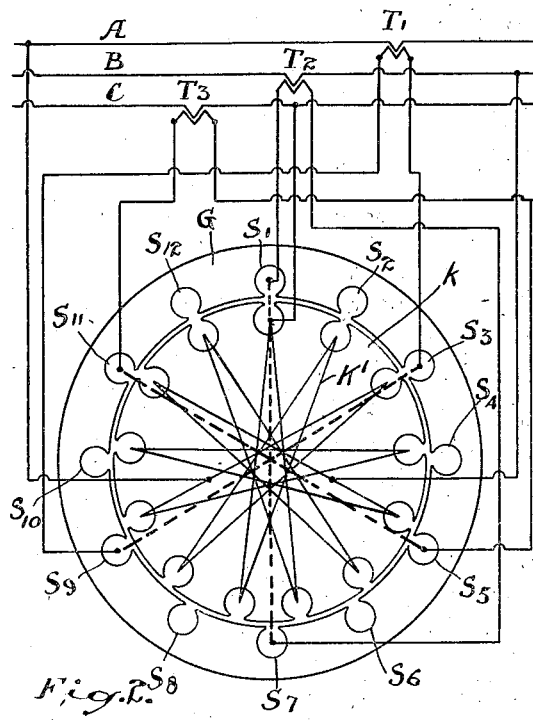
Figure 2 is a diagram of the preferred form of power factor meter.

The preferred form of magnetic circuit for the power factor element is shown in Figure 2 which follows the practice that many years of experience have shown is best adapted to the induction motor, in which the problem, in so far as the form of magnetic circuit is concerned, is similar to my power factor meter. Fig. 2 shows a power factor meter only, suitable to substitute for the structure F in Fig. 1. Additional functions can be obtained from such a structure as is shown in Figures 3, 4, 6 and 7 and such functions will be described later. Referring now to Figure 2, G is a laminated iron stator with 12 equally spaced slots $S_1$, $S_2$, $S_3$ etc. to $S_{12}$ in which the windings are placed. Twelve slots are not essential but this number allows for either 2 phase or 3 phase winding.

The rotor $k$ is preferably formed with 13 slots to receive the windings, a number prime to the number of stator slots being provided to minimize the tendency to magnetic locking. Other means well known in the art may also be used to reduce magnetic locking or "cogging" tendency to a negligible quantity. The rotor $k$ is illustrated as excited from the voltage of the 3 phase circuit ABC and the stator G from the current of ABC through transformers $T_1$, $T_2$, $T_3$ which produces, preferably, rotating magneto motive forces in both rotor and stator. A two pole field is shown as being preferable.

Figure 3:
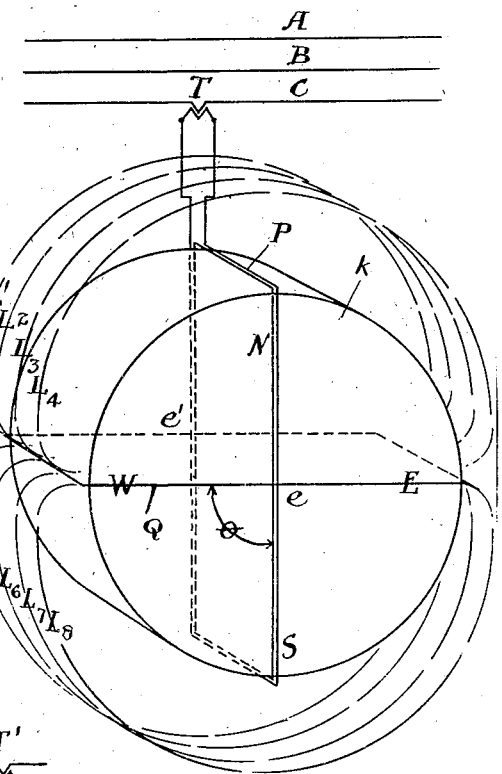
Figure 3 is a diagram illustrating the principles involved in the meter shown in Figure 2.

In Figure 3 is shown an analysis of the magnetic motive forces and the resulting magnetic fluxes that will be produced by the joint action of the stator and rotor windings of my power factor meter and also indicating some of the additional functions which I propose to use. $k$ represents the rotor of my device in isometric projection. The rotor $k$ is excited by a voltage winding similar to the winding $k'$ on $k$ in Figure 2, but these windings are omitted for the sake of showing other functions. These voltage windings $k'$ on $k$ will produce a magnetic flux of a rotating character and the lines $L_1$ to $L_8$ inclusive represent this flux at the instant that it becomes a maximum in the WE direction. The stator laminations in which this flux is conducted from W to E are omitted—also for the sake of clearness. It should be understood, of course, that this magnetic flux rotates with the frequency of the applied voltage; i. e., a quarter cycle later than the instant shown in Figure 3, the flux is a maximum in the NS direction, a quarter cycle still later, a maximum in the EW direction (180° from the condition shown in Figure 3) and a quarter cycle still later in the SN direction. That is, the magnetic flux rotates while the windings in which the magneto motive forces are produced as well as the magnetic circuit in which the flux is produced stand still.

If it is assumed that the rotor $k$ is free to rotate about the centre $e\ e'$ and that a stationary coil P surrounds the rotor and is excited by the current of the circuit under measurement, the coil P will be the seat of a magneto motive force which will produce an alternating magnetic flux which will flow through the rotor $k$ and return as indicated by lines $L_1$ to $L_8$. This alternating magnetic field will remain stationary in space and will be maximum at the instant the current in coil P is a maximum, and will of course alternate with the current which produces it.

Under the influences of these two magneto motive forces, the rotor $k$ (if it be free to move about its axis $ee'$) will assume an angular position such that the magnetic flux produced by their joint action is a maximum, that is, the rotor $k$ will assume such an angular position that the angular position of the flux produced by the rotating voltage excited windings on $k$ with reference to the plane of P will be the same as the time-phase of the flux produced by the stationary current coil P. Other stationary coils connected to the current phases of the circuit ABC may of course be added at the proper angular relation to the coil P.

The principles of the power factor meter as enunciated in the foregoing are of course well known and they are not claimed as new but it is new to use additional windings on a structure of this character to produce automatic phase shift with power factor. Such additional windings are shown and described later in this specification; for instance, the windings occupying slots 2—8 and 6—12 of the stator in Figure 4, those occupying slots 1—7 and 4—10 of the stator in Figure 6 and those occupying slots 3—9 and 5—11 of the stator in Figure 7. The principle governing the functioning of these additional windings is illustrated in Fig. 3. The additional windings above referred to are represented in Figure 3 by coil Q wound on the stator. A rotating field is set up in the rotor $k$, Figure 3 by windings not shown. The angular position of the rotor $k$ is dictated by the current in coil P. The phase angle between the voltage set up in coil Q and the current in coil P is dictated by the mechanical angle O between P and Q. In Figure 3 I am showing only single phase operation by coil P and Q; it is obvious however that polyphase circuits may be fed from similar additional coils to Q spaced at the proper mechanical angle around the stator. Such additional coils are shown in Figures 4, 5 and 7 and their functions described elsewhere in this specification.

Figure 4:
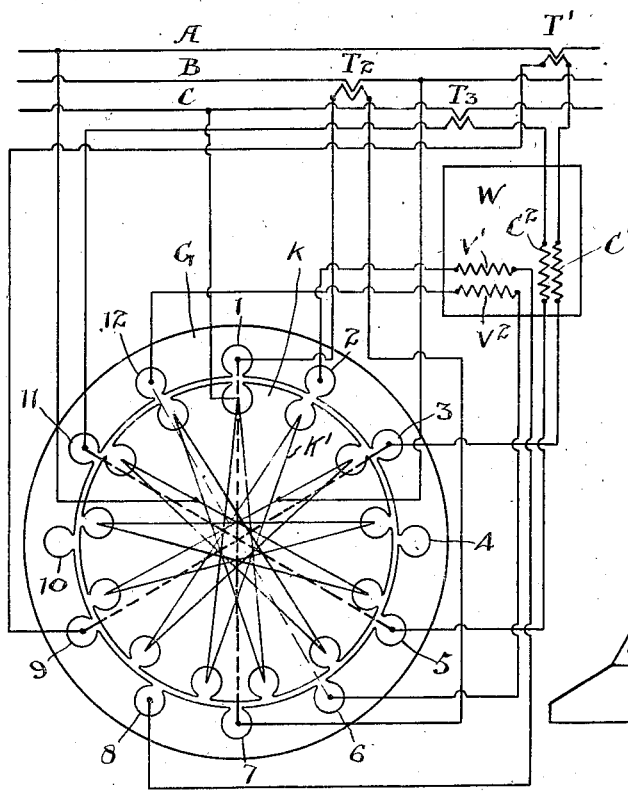
Figure 4 is a diagram illustrating the application of the meter shown in Figure 2 to the measurement of volt amperes in a 3 phase circuit.
Figure 5:
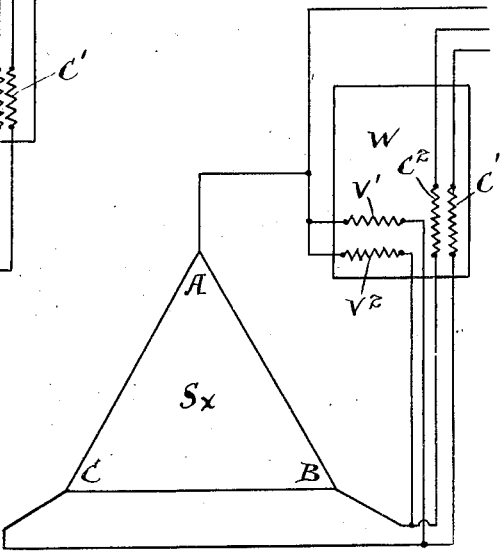
Figure 5 is a diagram illustrating the angular phase relation between currents and voltages in a normal 3 phase circuit.

In the diagram Figure 4, the property of my power factor meter with auxiliary windings above set forth is shown as applied to measure volt amperes in a 3 phase load independent of power factor. The stator G and rotor $k$ are the same as illustrated in Figure 2 with the rotor wound the same as any 3 phase induction motor to produce a rotating field.

W represents any standard polyphase watt meter or watt hour meter in which $C^1$ and $C^2$ are the current coils and $V^1$ and $V^2$ are the voltage coils. Currents proportional to the load to be measured are taken through the current coils $C^1$ and $C^2$ preferably by means of current transformers $T^1$ and $T^3$. Windings in the stator slots 3 and 9, arranged to function similar to coil P in Figure 3 are connected in series with transformers $T^1$ and coil $C^1$ and windings in slots 5 and 11 are connected in series with coil $C^2$ and transformer $T^3$. The two pairs of slots 3—9 and 5—11 are located at an angle of 120° apart. This is the same mechanical angle as the electrical angle between the currents circulating. Transformer $T^2$ conducts current through a winding in slots 1 and 7 but this may be omitted if desired as the common return from transformers $T^1$ and $T^3$ has the same value both in magnitude and phase position.

The action of these three currents in the stator G coupled with the action of the voltage-excited winding on $k$ cause the rotor $k$ to assume such a position that flux produced is a maximum, which position is dependent on the lag or lead of the load currents.

Windings are placed in slots 2—8 and in 6—12 which will function in a manner similar to coil Q in Figure 3 and in these windings there is produced a voltage 30° displaced in phase position from the current in the windings of slots 3—9 and 5—11 respectively, the direction of the phase displacement being different as it should be. This is illustrated in Figure 5 in which S$x$ represents a source of 3 phase supply ABC and W represents a polyphase watt meter connected in the usual manner and showing the electrical angle between current B and voltage AB as 30° and between current C and voltage AC as 30° in the opposite phase relation, that is, assuming a 100% power factor.

It will thus be seen that the power factor meter with any standard watt meter or watt hour meter with connections as illustrated in Figure 4 will measure volt amperes, or volt ampere hours of a three phase circuit at any power factor, lagging or leading, input or output.

In the diagram Figure 6 is shown the application of the method herein described to a two phase circuit, the only difference between the two phase and three phase arrangement being the windings and connections.

The stator G and rotor $k$ are the same as those described for a three-phase device. The current from the transformer $T^1$ in phase A is taken first through the current coil $C^1$ of the watt meter W and thence through the windings in the slots 6, 2, 8 and 12 of the stator. The current from the transformer $T^2$ in phase B is taken through the coil $C^2$ of the watt meter and thence through the windings in the slots 3, 11, 5 and 9 of the stator. The rotor is voltage excited and with these two currents circulating through the stator in the manner described the rotor $k$ will assume a position dictated by the lag or lead of the currents in transformers $T^1$ and $T^2$ such that the magnetic flux due to the combined rotor and stator windings is the maximum.

The voltage coil $V^1$ of the watt meter is excited from a winding laid in slots 1 and 7 of the stator and the voltage coil $V^2$ is excited from the winding in the slots 4 and 10, consequently the voltage of the coil $V^1$ is at all times in phase with the currents circulating in slots 6, 2 and 8, 12 and the voltage of the coil $V^2$ is in phase with the current in the slots 3, 11 and 5, 9 and the result is registration of volt amperes independent of the amount of lag or lead.

From the foregoing description it will be evident that volt amperes in a single phase circuit may be measured by producing a suitable rotating field in the rotor $k$ and this may be accomplished by proper well known methods of phase splitting of the exciting currents in the rotor.

In Figure 7 I show the application of the phase shifting functions of the power factor meter hereinbefore described in connection with a thermal demand meter to enable the measuring of demand in volt amperes rather than in watts as has been the practice.

Current from the current transformer $T^1$ of the three phase circuit ABC is led to the similar heaters $H^1$ and $H^2$ where it divides flowing equally therethrough and through a winding in the slots 3—9 of the stator. The winding in slots 3—9 is tapped at its midpoint and the tap leads directly to the winding in the slots 2—8 which is connected with transformer T'. The currents in the two halves of the winding are equal and opposite except for the influence of the voltage generated therein due to transformer action, consequently the current from the transformer $T^1$ flowing in the winding in slots 3—9 will have no position determining effect on the rotor $k$ to cause it to act as a power factor meter. This position determining effect is obtained by the winding in slots 2—8.

Similarly, the current from the current transformer $T^2$ is led to similar heaters $H^3$ and $H^4$ between which it divides equally and from thence passes through a winding in the slots 5—11 which winding is 120 electrical degrees from the windings in slots 3—9.

The current is taken from the mid point of the winding in the slots 5—11 and conducted through a winding in the slots 6—12. The winding in slots 5—11 will have no position determining effect, this being supplied for this phase by the winding in slots 6—12. The current from the transformer $T^1$ after passing through the windings in the slots 3—9 and 2—8 is combined with the current of the transformer $T^2$ after passing through the windings in the slots 5—11 and 6—12 and the resultant current is conducted through a position-determining winding arranged in the slots 4—10 returning thence to the transformers as shown. The voltage induced in the windings in slots 3—9 is 30° from the phase position of the current in the slots 2—8. This voltage causes a current to flow in series through the two heaters $H^1$ and $H^2$ and this voltage current combined with the load current from the transformer $T^1$ causes a difference in heat supplied to the two heaters $H^1$ and $H^2$ to be always proportional to volt amperes.

Similarly, the heaters $H^3$ and $H^4$ in the other phase will measure volt amperes in that phase and the sum of the two quantities gives a measure of the total volt amperes in the entire circuit ABC.

It is of course not new to use thermal watt meters for measuring demand in watts but it is new to apply to such measuring means a method of automatic phase shifting for the purpose of measuring demand in volt amperes.

It is sometimes desirable to ascertain the approximate power factor at which the volt amperes of demand are taken and this can be easily accomplished by providing indexes to be moved by the action of the power factor meter.

As indicated in Figure 8 an indicator arm R is attached to the rotor $k$ and a suitable scale T marked in power factor or other desirable values is arranged in the path of movement of this arm. Indexes U and V are arranged upon the scale and as the rotor assumes various positions, depending upon the power factor of the circuit under measurement, either index member will be moved along the scale so that when a reading is taken the position of these indexes will be noted and they will indicate the limits of the power factor between which the demand in volt amperes has occurred. After reading, these indexes may be moved into contact with the arm R to repeat their indication.

The rotor of the power factor meter as herein described is wound to set up a rotating field, and under certain conditions the action of this rotating field may cause losses in the stator windings which may induce an action partially that of an induction motor, consequently the proper functioning as a power factor meter will be somewhat impeded. In order to overcome this condition of partial error, I provide a helical spring $W^1$ having its inner end secured to the shaft $e$ of the rotor $k$ and its outer end $W^2$ is adjustably secured at any point in the stationary circular guide slot N. The value of the torque tending to rotate $k$ as an induction motor will depend on the resistance of the local short circuited circuits in the stator G and upon the voltage applied to the rotor $k$. Both of these quantities are practically constant and the tension of the spring $W^1$ may be adjusted to compensate for the tendency to rotate. It may not be found desirable to utilize a mechanical corrective member such as described and the desired result may be achieved by arranging the position determining windings sufficiently powerful to overcome the induction motor torques set up. Such an arrangement may not be effective at low loads in overcoming the induction motor torque and the spring will then be necessary.

An important feature in designing a power factor meter for the purpose described is to provide a minimum current and losses in the windings that excite the rotor. Referring to the diagram Figure 2, if there is no current flowing from transformers $T^1$ $T^2$ $T^3$ all of the excitation required by the magnetic circuit is taken through the rotor winding. When the currents in the transformers are a maximum the resulting magnetic flux is produced by the joint action of the rotor and stator windings. As has been described, with exciting currents in both windings, the rotor $k$ will assume such a position as will result in the maximum magnetic flux.

It must not be assumed that the flux is materially increased by the action of the stator windings assisting the rotor windings. If for instance, it requires 100 ampere turns to excite the rotor $k$ with a given voltage applied to the windings of the rotor and no excitation is applied to the stator and then assume that a current flows through the stator windings so that 100 ampere turns are provided by the stator, the voltage applied to the rotor has not changed, consequently the flux cutting the rotor windings cannot change materially. The existence of 100 ampere turns in the stator will simply mean that the current taken by the voltage-excited winding of the rotor is reduced to practically zero and the magnetic flux will be increased only to the extent of the voltage drop through the resistance and leakage reactance of the rotor circuit. The counter E. M. F. of the rotor must of course always be equal to the applied E. M. F. If the counter E. M. F. is made up of a large factor, due to the rotating flux, plus a small factor, due to resistance and magnetic leakage, it is obvious that a change in the rotor current can affect only the small factor due to rotor resistance and magnetic leakage, the magnetic leakage being the magnetic flux which links only the rotor windings without also linking the stator windings. It is important therefore that the design of the device be such that the resistance and leakage reactance voltages, due to the current flowing in the rotor, be a minimum.

The automatic feature herein described is very desirable but if the position determining windings are omitted or prevented from functioning the rotor may be operated manually, similarly to the switch arm D shown in Figure 1, to shift the phase. When thus used the watt meters may be used at will as watt meters, as reactive volt ampere meters or as meters reading volt-amperes correctly at certain specific power factors depending on the angular position at which the rotor is manually adjusted.

In the diagrams herein shown the voltages in the rotor and stator are the same but the stator may be on one voltage and act as a voltage transformer by having lower voltage windings on the rotor or vice versa. This will enable the use of a low voltage meter on a high tension current.

What I claim as my invention is:—
1. Means for measuring volt amperes, comprising a power factor meter having current windings and voltage windings relatively movable, a watt meter, a secondary winding on said power factor meter connected with said watt meter, an indicator arm attached to the movable element of said power factor meter, a stationary scale arranged in the path of movement of said arm, and movable indexes arranged upon said scale and operatively engaged by said arm.

2. Means for measuring volt amperes, comprising an A. C. circuit, a power factor meter having current and voltage windings separately connected to the A. C. circuit, a secondary winding on said power factor meter, a watt meter connected with said secondary windings, and an adjustable resistance medium connected with the rotor of said power factor meter adapted to counterbalance the induction motor action of the rotor.

3. Means for measuring volt amperes, comprising an A. C. circuit, a power factor meter having current and voltage windings separately connected to the A. C. circuit, a secondary winding on said power factor meter, a watt meter connected with said secondary windings, and a helical spring having one end secured to the rotor and its other end adjustably secured to the stator of the power factor meter to vary the value of the torque tending to rotate the rotor as an induction motor.

LOUIS A. PAINE.